United States Patent
Ito

(10) Patent No.: US 7,543,103 B2
(45) Date of Patent: Jun. 2, 2009

(54) HOST APPARATUS

(75) Inventor: Takafumi Ito, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 256 days.

(21) Appl. No.: 11/276,628

(22) Filed: Mar. 8, 2006

(65) Prior Publication Data

US 2006/0224819 A1    Oct. 5, 2006

(30) Foreign Application Priority Data

Mar. 31, 2005    (JP) ............................. 2005-105084

(51) Int. Cl.
    *G06F 12/00* (2006.01)
(52) U.S. Cl. ....................... 711/103; 711/112
(58) Field of Classification Search ................ 711/103, 711/112, 114
    See application file for complete search history.

(56) References Cited

U.S. PATENT DOCUMENTS

| | | | | |
|---|---|---|---|---|
| 5,740,396 A | * | 4/1998 | Mason | 711/103 |
| 5,887,198 A | | 3/1999 | Houlberg et al. | |
| 7,069,379 B2 | * | 6/2006 | Inagaki | 711/112 |
| 7,139,864 B2 | * | 11/2006 | Bennett et al. | 711/103 |
| 7,167,944 B1 | * | 1/2007 | Estakhri | 711/103 |
| 2005/0144365 A1 | * | 6/2005 | Gorobets et al. | 711/103 |
| 2006/0224819 A1 | * | 10/2006 | Ito | 711/103 |
| 2007/0226404 A1 | | 9/2007 | Ito et al. | |

FOREIGN PATENT DOCUMENTS

| | | |
|---|---|---|
| EP | 1 043 729 A2 | 10/2000 |
| EP | 1 653 362 A1 | 5/2006 |
| JP | 2003-296177 | 10/2003 |
| WO | 2005/015406 A1 | 2/2005 |
| WO | WO 2006/030966 A2 | 3/2006 |

OTHER PUBLICATIONS

Sandisk Corporation, "sandisk standard grade CompactFlash and PC Card" Product Manual Version 1.5 Document No. 80-36-00267, XP002382405, Mar. 2004, pp. i-vi, 85.

* cited by examiner

Primary Examiner—Brian R Peugh
(74) Attorney, Agent, or Firm—Oblon, Spivak, McClelland, Maier & Neustadt, P.C.

(57) ABSTRACT

A host apparatus controls a memory system which has a nonvolatile semiconductor memory. The host includes an application which performs predetermined operations in accordance with a program and issues a write function invocation. A file management system has a function to allocate unit regions into which a memory area of the nonvolatile semiconductor memory is divided as a write area which stores write data, uses management units each of which is natural-number multiple times as large as the unit region as units for determining allocation, and allocates the management units as the write area in an order of realizable write speed of the management units when receiving the write function invocation. A controller issues an instruction to the memory system to write the write data into the nonvolatile semiconductor memory in accordance with an instruction by the file management system.

14 Claims, 10 Drawing Sheets

[ Disc Parameter of FAT 32 ]

| Offset | Size (bytes) | Contents | Value |
|---|---|---|---|
| 3 | 8 | OEM name | |
| 0B | 2 | Sector size | 512 |
| 0D | 1 | Sector number / cluster | |
| 0E | 2 | Reserved sector number | |
| 10 | 1 | Number of FATs. | |
| 11 | 4 | (Reserved) | |
| 15 | 1 | Media descriptor | |
| 16 | 2 | Sector number / FAT | |
| 18 | 2 | Sector number / track | |
| 1A | 2 | Head number | |
| 1C | 4 | Hidden sector number | |
| 20 | 4 | Total big sector number | |
| 24 | 4 | Big sector number / FAT | |
| 28 | 2 | Extended flag | |
| 2A | 2 | File system version | |
| 2C | 4 | First cluster of route | |
| 30 | 2 | File system information sector position | |
| 32 | 2 | Backup boot sector position | 6 |
| 34 | 12 | (Reserved) | |
| 40 | 1 | Drive ID | |
| 41 | 1 | (Reserved for NT) | |
| 42 | 1 | Extended boot sign | |
| 43 | 4 | Serial number | |
| 47 | 11 | Volume name | |
| 52 | 8 | File system type | FAT32 |
| 60 | 1 | Flash device flag (FDF) | |
| 61 | 2 | Erase block size (×512 Byte)(EBS) | |
| 62 | 2 | Write page size (×512 Byte)(PS) | |
| 63 | 2 | RU size (kB) | |
| 65 | 2 | AU size (×64 kB) | |
| 67 | 1 | Write performance Pw (MB/sec) | |
| 68 | 1 | Move performance Pm (MB/sec) | |

FIG. 6

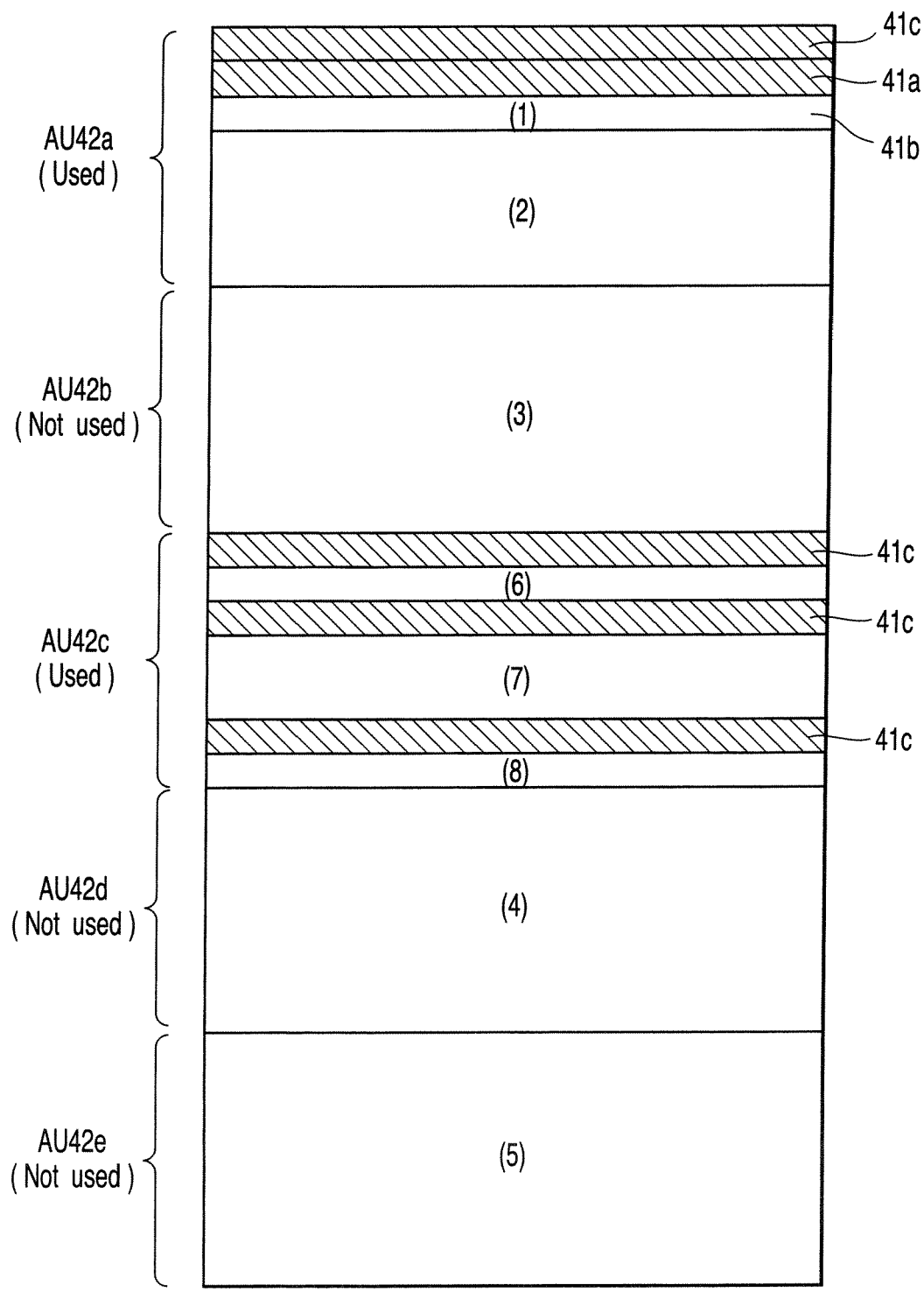
F I G. 8

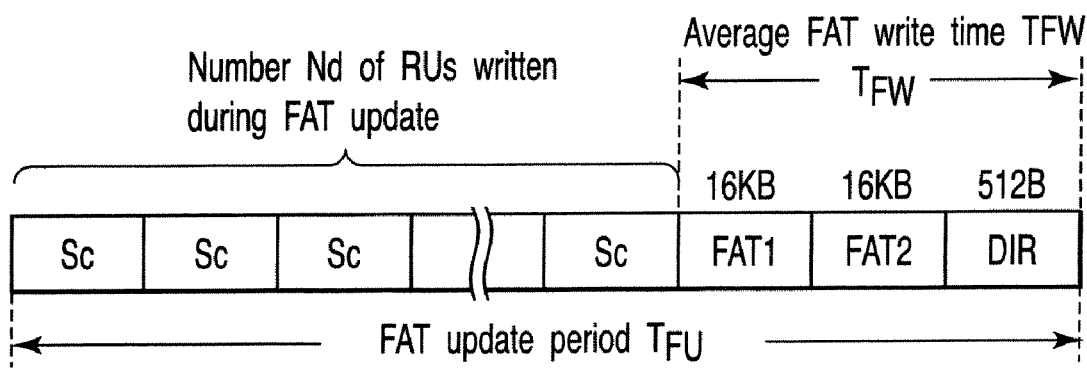
F I G. 13

HOST APPARATUS

CROSS-REFERENCE TO RELATED APPLICATIONS

This application is based upon and claims the benefit of priority from prior Japanese Patent Application No. 2005-105084, filed Mar. 31, 2005, the entire contents of which are incorporated herein by reference.

BACKGROUND OF THE INVENTION

1. Field of the Invention

The present invention relates to host apparatus, such as host apparatus into which a memory card may be inserted.

2. Description of the Related Art

Presently, a memory card is used which utilizes a nonvolatile semiconductor memory such as a flash memory as a medium for recording music data and video data. A typical example of the flash memory used in the memory card is a NAND-type flash memory.

The NAND-type flash memory has the following characteristics: (1) data is written in page units; (2) data is erased in units referred to as blocks each of which includes pages. Therefore, when data is to be updated in a page included in a block which has a data-written page, the following process referred to as "data-move accompanying write (collateral data copy)" needs to be performed. Data-move accompanying write involves writing to-be-written data (new data) into a new block having no written data and copying the remaining data, which is in the old block containing the old data (data to be updated into the new data) and not to be updated, into the new block. Therefore, it sometimes takes considerable time to write one page. Note that if data is sequentially written into consecutive pages starting from a top page of a block, data-move accompanying write does not occur, thus enabling efficient data writing.

A file allocation table (FAT) file system is presently used as for a memory card. The FAT file system involves reading and writing of data in data units referred to as clusters, so that to which cluster each of data item is assigned is managed by using a table referred to as an FAT. In the FAT file system, FAT and cluster data are written and updated at random.

Therefore, generally, data-move accompanying write frequently occurs in a memory card that employs both a NAND-type flash memory and an FAT file system. As a result, file writing and rewriting is sometimes slow.

A file system of host apparatus that utilizes such a memory card is currently not provided with an application program interface (API) that takes into account the above-described characteristics. This has proved a problem in particular for an application that handles AV data for which a data writing speed not less than a certain level is demanded.

BRIEF SUMMARY OF THE INVENTION

According to a first aspect of the present invention, there is provided a host apparatus controlling a memory system which has a nonvolatile semiconductor memory, the host apparatus comprising: an application performing predetermined operations in accordance with a program and issuing a write function invocation; a file management system having a function to allocate unit regions into which a memory area of the nonvolatile semiconductor memory is divided as a write area which stores write data, using management units each of which is natural-number multiple times as large as the unit region as units for determining allocation, and allocating the management units as the write area in an order of realizable write speed of the management units when receiving the write function invocation; and a controller issuing an instruction to the memory system to write the write data into the nonvolatile semiconductor memory in accordance with an instruction by the file management system.

According to a second aspect of the present invention, there is provided a host apparatus controlling a memory system which has a nonvolatile semiconductor memory, the host apparatus comprising: an application performing predetermined operations in accordance with a program and issuing an area reserve function; a file management system having a function to allocate unit regions into which a memory area of the nonvolatile semiconductor memory is divided as a write area which stores write data, the file management system, when receiving the area reserve function, reserving a reserved area constituted of the unit regions having a size in accordance with a size of the write data, issuing an instruction to write tentative management data into the reserved area, issuing an instruction to write the write data without writing the management data after allocating the reserved area as the write area, and issuing an instruction to write the final management data after writing of the write data is finished; and a controller issuing an instruction to the memory system to write the write data and the management data into the nonvolatile semiconductor memory in accordance with an instruction by the file management system.

According to a third aspect of the present invention, there is provided a host apparatus controlling a memory system which has a nonvolatile semiconductor memory, the host apparatus comprising: an application performing predetermined operations in accordance with a program and issuing a area inquiry function including information of a requested write speed; a file management system having a function to allocate unit regions into which a memory area of the nonvolatile semiconductor memory is divided as a write area which stores write data and notifying the application of the number of the unit regions capable of realizing writing at a speed not less than the requested write speed when receiving the area inquiry function; and a controller issuing an instruction to the memory system to write the write data into the nonvolatile semiconductor memory in accordance with an instruction by the file management system.

BRIEF DESCRIPTION OF THE SEVERAL VIEWS OF THE DRAWING

FIG. 6 shows parameters written in a BIOS parameter block according to the first embodiment;

FIG. 8 shows order of RUs written by the host apparatus according to the first embodiment;

FIG. 13 exemplifies a sequence for updating a file system during real-time writing.

DETAILED DESCRIPTION OF THE INVENTION

The following will describe embodiments of the present invention with reference to drawings. It is to be noted that in the following description, components having approximately the same functions and configurations are indicated by the same reference symbols and not described twice unless necessary.

(1) First Embodiment

[1-1] Configuration

Figure 1:
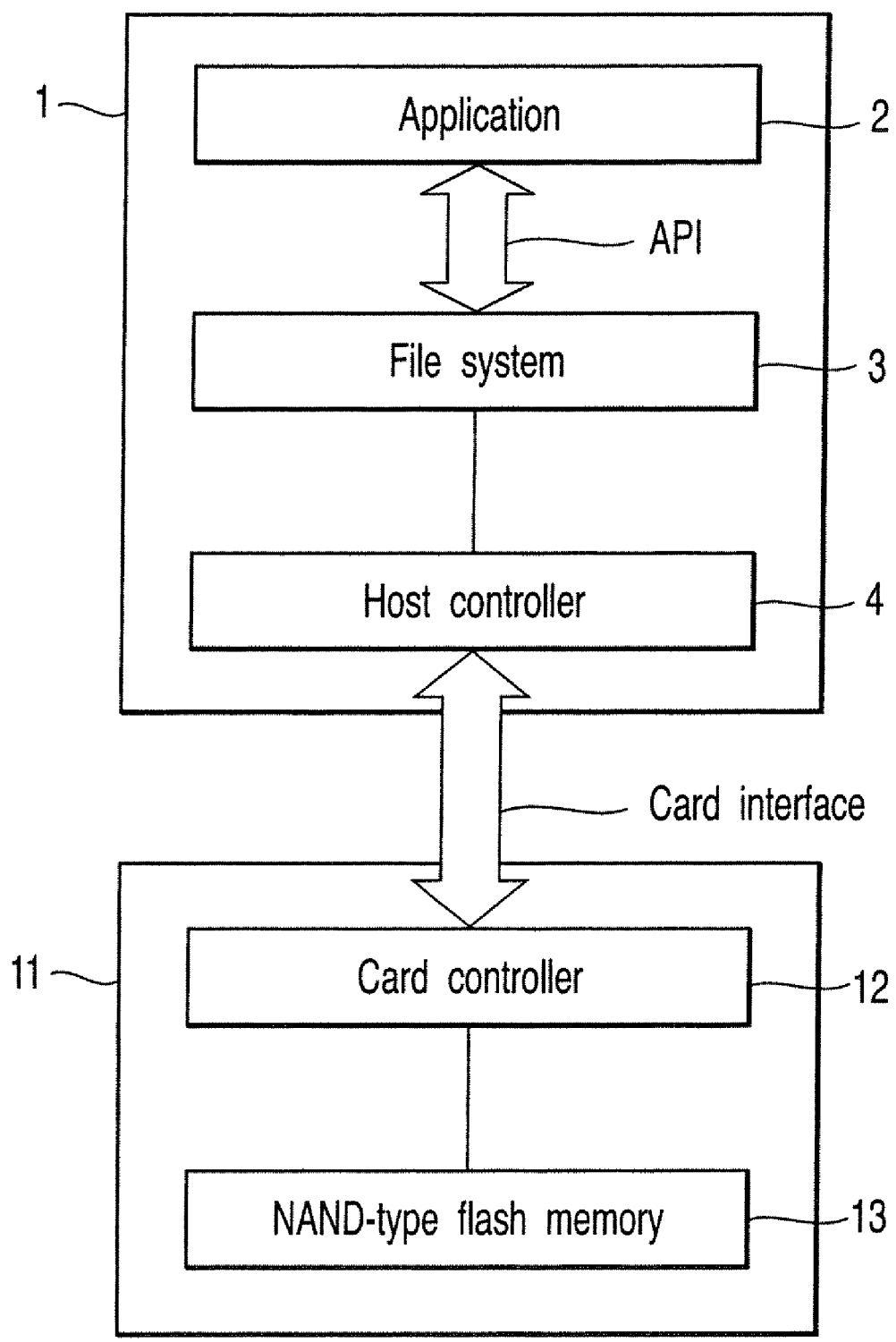
FIG. 1 shows a configuration of main components of host apparatus according to a first embodiment of the present invention.

FIG. 1 shows a configuration of main components of host apparatus according to a first embodiment of the present invention. Host apparatus (hereinafter referred to as a host) 1 includes hardware and software for accessing a memory card 11 connected thereto. More specifically, as shown in FIG. 1, the host has at least an application 2, a file system (file management system) 3, and a host controller 4. The memory card 11 has a card controller 12 and an NAND-type flash memory (hereinafter referred to as a flash memory) 13. A configuration of the memory card 11 is described in detail later.

Although in the present embodiment and later-described second and third embodiments, a memory card is exemplified in explanation, the present invention is not limited to it. That is, the present invention can be applied to a memory system having any form as long as it includes the flash memory 13.

The application 2 is realized by programs in a read-only memory (ROM) and/or a random access memory (RAM). A central processing unit (CPU) performs predetermined processes in accordance with a program read to the RAM. When data is written to the memory card 11, the application 2 supplies the file system 3 with a signal to that effect. The application 2 supplies the file system 3 with a signal to write data into the memory card 11.

The file system 3 manages data that the application 2 desires to write according to the file system. That is, the file system 3 reads and writes file data in data units referred to as clusters and uses a table stored in an internal memory of the file system 3 to manage to which cluster the file data is assigned. The API is used to deliver instructions and responses between the application 2 and the file system 3.

The host controller 4 has a function to control operations for reading data from and writing it to the memory card 11 in accordance with a request from the file system 3. More specifically, the host controller 4 supplies the memory card 11 with commands for causing the memory card 11 to write, read, and erase data. The host controller 4 has an interface with the memory card 11, to communicate with the memory card 11 via this interface.

Figure 2:
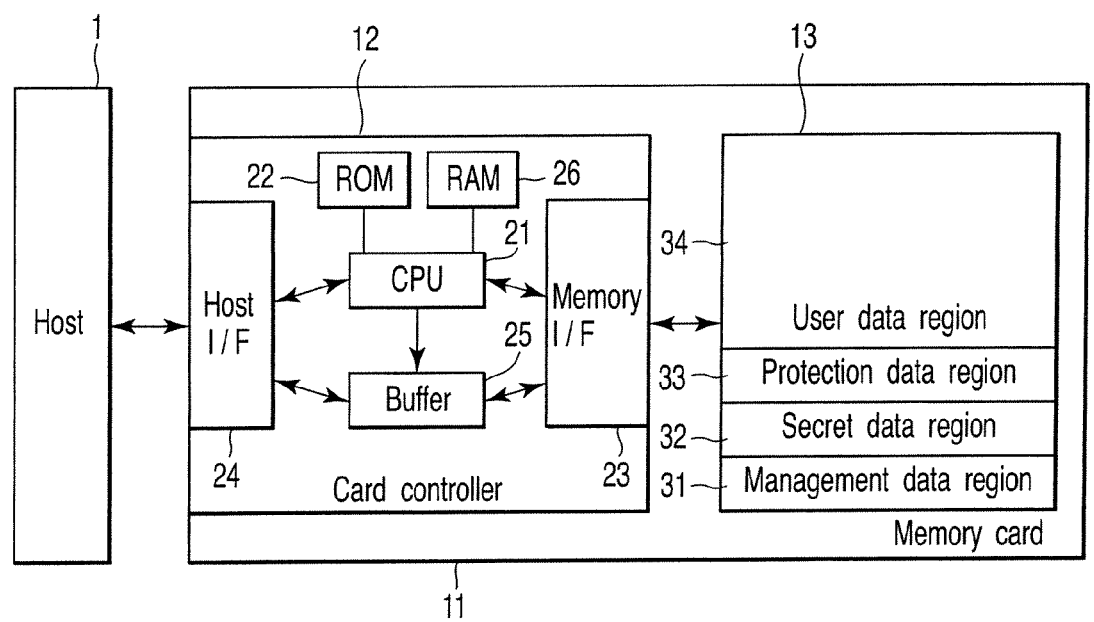
FIG. 2 is a block diagram of a configuration of a memory card used in the host apparatus according to the first embodiment.

The following will describe the memory card used in the host of FIG. 1 with reference to FIG. 2. FIG. 2 is a block diagram of a configuration of the memory card 11 used in the host according to the first embodiment. The memory card 11 operates on power which is supplied when it is connected to the host 1, to perform processes in response to access from the host 1.

The card controller 12 is constructed so as to manage a physical state of an inside of the flash memory 13 (i.e., what number logical sector address data is included in which physical block address or which block is erased). As shown in FIG. 2, the card controller 12 includes a CPU 21, a ROM 22, a memory interface section 23, a host interface section 24, a buffer 25, and a RAM 26.

The memory interface section 23 performs interface process between the card controller 12 and the flash memory 13. The host interface section 24 performs interface process between the card controller 12 and the host 1.

The buffer 25 temporarily stores a constant quantity of data (e.g., one page of data) when the data sent from the host 1 is written to the flash memory 13. The buffer 25 temporarily stores a constant quantity of data when the data read from the flash memory 13 is sent out to the host 1.

The CPU 21 controls operations of the memory card 11 as a whole. For example, when the memory card 11 is supplied with power, the CPU 21 loads firmware (control program described later) stored in the ROM 22 into the RAM 26, to perform predetermined process. This process serves to form a variety of tables (which are described later) in the RAM 26. The CPU 21, when receiving a write command, a read command, or an erasure command from the host 1, performs predetermined process in the flash memory 13 or controls data transfer process via the buffer 25.

The ROM 22 stores a control program controlled by the CPU 21. The RAM 26 is used as a working area of the CPU 21 and stores the control program and the variety of tables.

The flash memory 13 is a nonvolatile semiconductor memory in which a size of an erase, that is, a size of a block as a unit in which data is erased is set to, for example, 256 k bytes (256 kB), thus reading and writing data in units of, for example, 16 kB. Note that the flash memory 13 may be a binary memory for storing one-bit information in each memory cell thereof or a multi-valued memory for storing two bits or more of information in each memory cell. Further, the flash memory 13 and the controller 12 may be separately provided on a substrate or arranged on the same large-scale integrated circuit (LSI).

A region (data storage region) where data of the flash memory 13 is written is divided into regions according to what type of data is to be saved. The flash memory 13 includes such data storage regions as a user data region 34, a management data region 31, a secret data region 32, and a protection data region 33.

The user data region 34 stores user data and can be freely accessed and used by a user who uses the memory card 11.

The management data region 31 mainly stores management information about the memory card as well as card information such as security information and media ID of the memory card 11.

The secret data region 32 stores secret data and saves key information used in encryption and secret data used in authentication but cannot be accessed by the host 1.

The protection data region 33 stores important data and can be accessed only if authenticity of the host 1 connected to the memory card 11 is confirmed by mutual authentication with the host 1.

Figure 3:
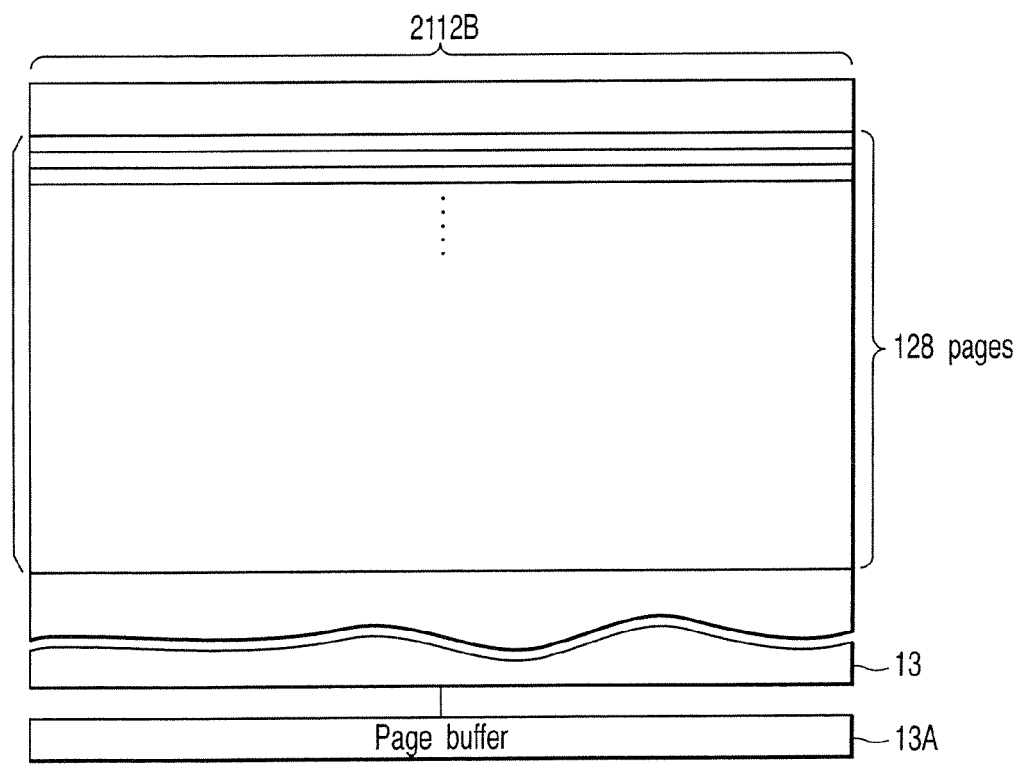
FIG. 3 shows data arrangement in a flash memory.

FIG. 3 shows data arrangement in the flash memory 13. Each of pages of the flash memory 13 has a capacity of, for example, 2112B (=512B of data storage section×4+10B of redundancy section×4+24B of management data storage section). Further, one erasure unit is, for example, 128 pages, i.e., 256kB+8kB, where k=1024.

The flash memory 13 further includes a page buffer 13A for inputting data to and outputting it from the flash memory 13. The page buffer 13A has a storage capacity of, for example, 2112B (2048B+64B). In data writing, the page buffer 13A performs data input/output process to the flash memory 13 in units of one page corresponding to its own storage capacity.

Although FIG. 3 shows an example where the erasure unit is 256kB, it may be, for example, 16kB. In this case, each of the pages has a capacity of 528B (=512B of data storage section +16B of redundancy section), 32 pages of which constitute one erasure unit (i.e., 16kB+0.5kB).

The host 1 divides the user data region 34 of the flash memory 13 into units referred to as recording units (RUs) each of which has a capacity of 16kB so that data such as moving picture data is written in the RUs. That is, an RU (recording unit region) corresponds to a unit in which data is written by a multi-block write command, which serves for writing some consecutive SD blocks (one SD block=512B) with one command.

The RU may have the same size as or integer multiple times as large as the size of a cluster defined by the SD™ file system. A unit of the RU may be 32kB, 64kB, 128kB, etc.

Figure 4:
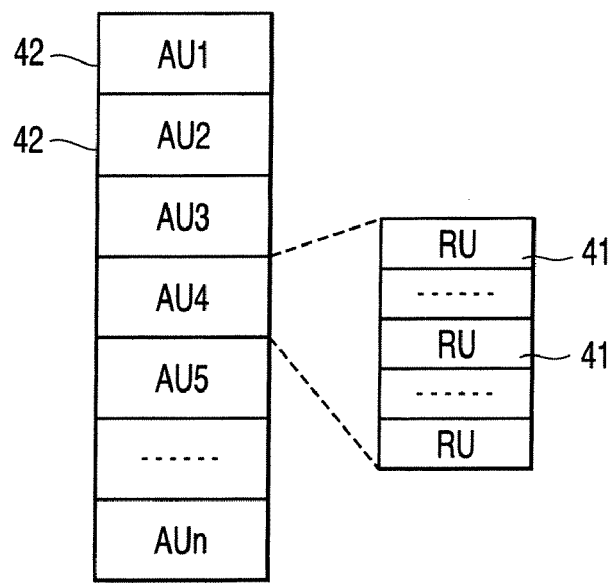
FIG. 4 shows how a memory area of the flash memory is divided when viewed from the side of the host apparatus.
Figure 5:
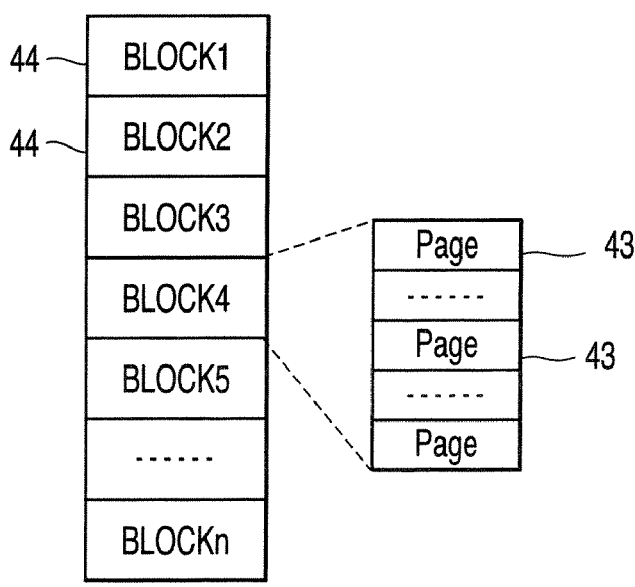
FIG. 5 shows an outline of actual division of a memory area in the flash memory.

In the flash memory 13, data is written and read in units of a page (e.g., 2kB) and erased in units of a block (e.g., 256kB). Comparison between these is shown in FIGS. 4 and 5. FIG. 4 shows how the memory area of the flash memory 13 is divided when viewed from the host 1 and FIG. 5 shows an outline of actual division of the memory area in the flash memory 13. As shown in FIG. 4, when viewed from the host 1, an RU 41 recognizes the RUs 41 as a storage unit (unit region). One AU (management region) 42 is defined as a group of the RUs 41. The allocation unit (AU) is described later.

On the other hand, as shown in FIG. 5, in the flash memory 13, a block 44 is configured by pages 43. This relationship is similar to a relationship between the RU 41 and the AU 42 as viewed from the side of the host apparatus of FIG. 5. However, it is not necessary that the page 43 and the RU 41 should be the same as each other, and the RU 41 can be natural-number multiple times as large as a size of the page 43. Similarly, the AU 42 can be as natural-number multiple times as large as the block 44.

[1-2] Parameters

A physical parameter (attribute) of a storage medium is written in a BIOS parameter block (BPB) of the user data region 34 in the flash memory 13. A file system uses this parameter. When formatting the flash memory 13, the host 1 writes this parameter as described later. The file system reads a BPB upon activation, to thereby recognize the parameter of the flash memory 13.

FIG. 6 shows parameters written in a BPB according to the first embodiment. When the file system is a FAT 32, the BPB is given as shown in FIG. 6. As shown in FIG. 6, the BPB stores parameters of an OEM name, a sector size, the number of sector/cluster, the reserved sector number, the number of FATs, a media descriptor, the number of sectors/FAT, the number of sectors/track, the number of heads, the number of hidden sectors, a total number of big sectors, the number of big sectors/FAT, an extended flag, a file system version, a first cluster of route, a file system information sector position, a backup boot sector position, a drive ID, an extended boot sign, a serial number, a volume name, a file system type, a flash device flag (FDF), an RU size, and an AU size. An erase size (EBS), a write page size (PS), a write performance PW, and a move performance Pm are described with a third embodiment.

The flash device flag indicates that a target medium is a flash memory device. For example, value "0" in the flash device flag indicates that the target medium is not a flash memory device but, for example, a floppy™ disk, hard disk. Value "1" in the flash device flag indicates that the target medium is a flash memory device.

The flash device flag written in a BPB allows the file system 3 to directly read the information. The file system 3 and the application 2 use this information to control writing and realize a higher write speed.

The following will describe operations of the host 1 when it formats the memory card 11. When the memory card 11 is inserted into a slot of a memory card reader, the host 1 reads an FAT. If the FAT cannot be read, that is, the flash memory 13 is yet to be formatted and the user still wishes to format the flash memory, the host starts formatting the flash memory 13.

Next, a boot sector, a directory area, an FAT area, and a data area are reserved. Next, the BPB is written into the boot sector. Parameters from the OEM name through the file system type in FIG. 6 are acquired as in the conventional manner.

A parameter of the flash device flag is written in accordance with information extracted from a response to a command sent by the host 1 to the memory card 11 in order to obtain information of the flash memory 13. The command sent by the host 1 in order to obtain the information of the flash memory 13 is prepared by standards of the memory card 11. However, when a host is not equipped with such a command, a user of formatting software manually sets a value of the above-described parameter, which formatting software in turn writes that value into the BPB.

An RU and an AU are concepts used by a host 1 when it manages, for example, writing of data into the flash memory, so that the host 1 knows their sizes. For example, when formatting the flash memory 3, the host 1 sets parameters of an RU size and an AU size into the BPB.

[1-3] Write Operation

Figure 7:
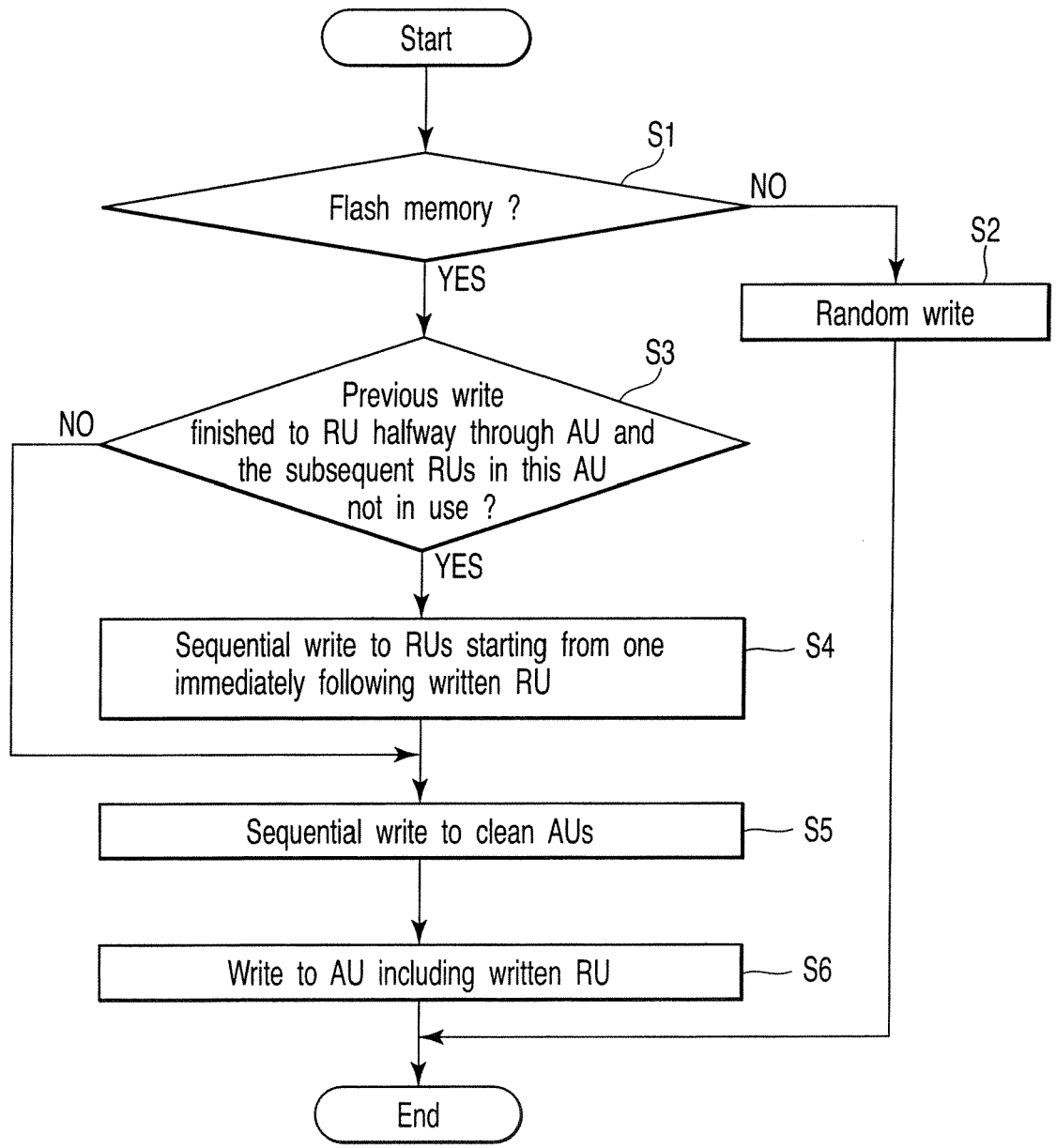
FIG. 7 shows a flow of a write operation of the host apparatus according to the first embodiment.

The following will describe data writing with reference to FIGS. 7 and 8. FIG. 7 is a flowchart showing writing of the host apparatus according to the first embodiment. FIG. 8 shows order of RUs written by the host apparatus according to the first embodiment.

The API between the application 2 and the file system 3 incorporates write function invocation that can realize the following writing. Through this write function invocation, the application 2 instructs the file system 3 for writing.

The file system 3 allocates data to a proper RU 41 and instructs the card controller 12 so that the data is actually written into the allocated RU 41 to realize the operations shown in FIGS. 7 and 8. Note that the file system 3 realizes writing in RU units by writing data in cluster units as considering the RUs.

Hereinafter, the description of "writing" data by the file system 3 is supposed to mean allocating an not-in-use RU 41 as a data write area and issuing an instruction to the memory card to actually write data into the allocated RU 41. This holds true also with a case where data is "written" into the RU 41.

As shown in FIG. 7, first the file system 3 references an FDF in a BPB to check whether a medium to which data is to be written is a device that uses a flash memory (step S1). If the medium is not a flash device, the process performs random write similar to that for an ordinary floppy™ disk or a hard disk without considering an erase block size etc. (step S2).

On the contrary, if the medium is a flash device, the file system 3 checks a FAT. Actually, the file system 3 checks whether previous write data has been allocated to the RU 41 somewhere through the AU 42 and the subsequent RUs 41 in that AU 42 are not in use (step S3). If this decision result is true, the data is sequentially written into the RUs 41 starting from an RU 41b next to an most-recently written RU 41a in an AU 42a (step S4) as shown in FIG. 8.

Data is sequentially written into the consecutive RUs not in use, which realizes data write at a maximum speed within a write capability range of the flash memory 13. Note that a reference symbol 41c in FIG. 8 indicates an RU into which data has already been written.

Next, when writing to the AU 42a finished halfway during the previous writing is finished, the file system 3 checks an FAT to search for an AU 42 (clean AU 42) having no RU 41 already used. It then performs writing to clean AUs 42b, 42d, and 42e in this order (step S5). Note that order of performing writing to the clean AUs 42b, 42d, and 42e is not limited to this.

On the other hand, if decision of step S3 has turned out to be negative, the file system 3 moves to step S5.

If a write request is still given even after writing to all the clean AUs 42 is finished, data is written into an RU 41 in an AU 42c having an RU 41 to which data has already been written.

After data is deleted several times to leave all RUs 41 in an AU 42 not in use (no valid data held in it), this AU 42 is handled as a clean AU 42.

The host according to the first embodiment of the present invention has a write function invocation, which is delivered between the application 2 and the file system 3, to realize a predetermined write operation. When receiving this write function invocation, the file system 3 considers a write speed of AUs 42 defined by arrangements of the used RUs 41 in the AU 42 (called fragmentation) and writes to RUs 41 in AUs 42 which realize the fastest writing and to RUs 41 in AUs 42 which allows a slowest speed one after another. It is thus possible to suppress a decrease in data write speed in a flash device.

(2) Second Embodiment

The second embodiment has a function for the purpose of permitting an API between an application and a file system to update the file system efficiently. It has the same configuration as that of the first embodiment except for the different API.

In the file system, file sizes etc. of a FAT and a directory entry (hereinafter, "FAT" may be meant to include a FAT and a directory entry) are updated at predetermined interval (one through several seconds) during data writing or updating. Accordingly, even if data writing is not completed owing to a problem such as system hung-up during the data writing, it is possible to prevent that writing from being invalid completely, thereby recovering data up to a point in time of updating of the most recent FAT.

However, as described above, a flash device takes long time to update data. Therefore, it takes considerable time to update FATs, so that updating the FATs at an interval decreases data write speed.

[2-1] Writing

Figure 9:
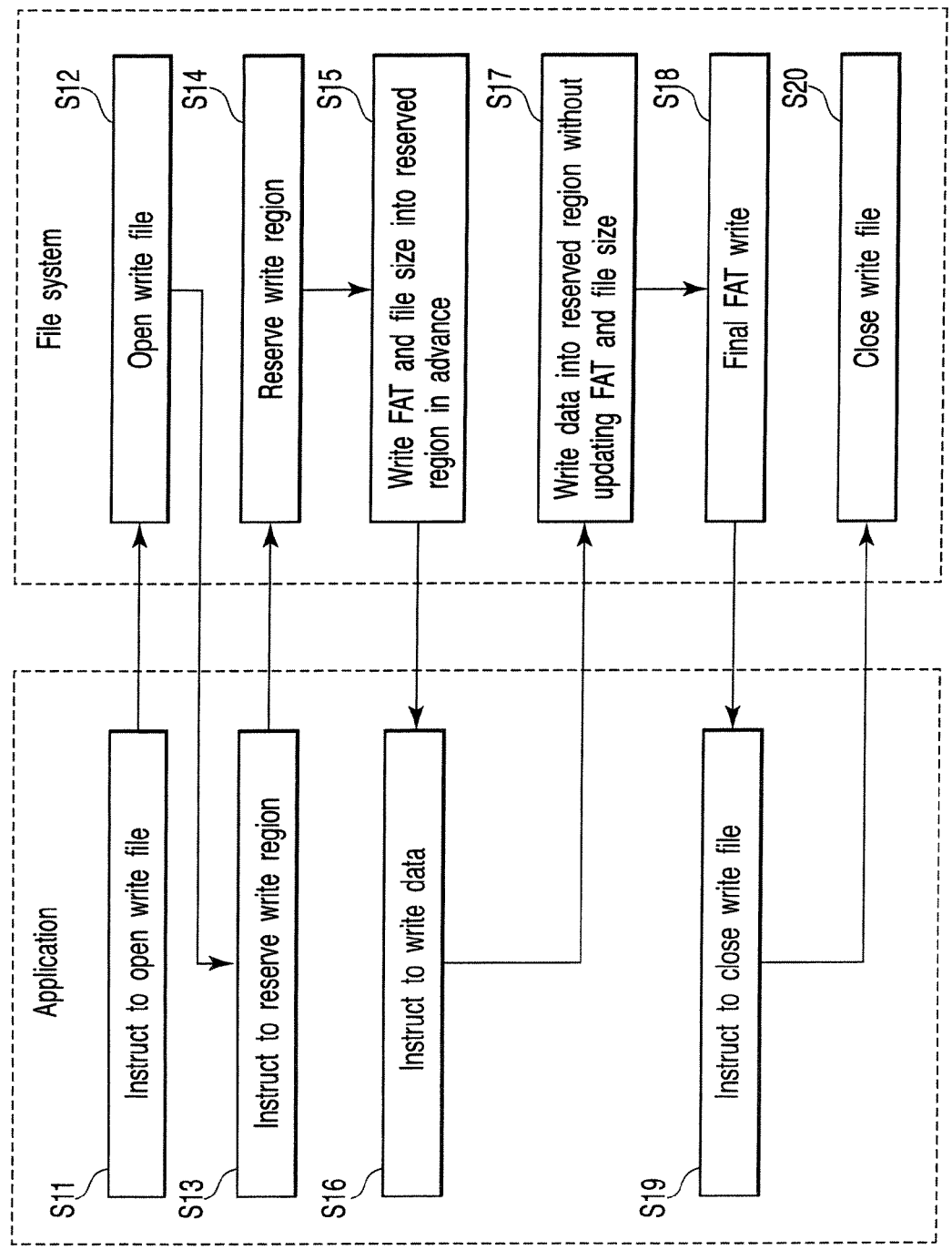
FIG. 9 shows a flow of a write operation of host apparatus according to a second embodiment of the present invention.

The following will describe a data write by a host according to the second embodiment, with reference to FIG. 9. FIG. 9 shows a flow of writing of the host according to the second embodiment. An API between an application 2 and a file system 3 has a function that can realize the following write operation.

As shown in FIG. 9, when data write is required owing to, for example, a request by a user for writing data, the application 2 issues to the file system 3 a file open function instructing to open a write file (step S11). Prior to performing a series of write operations shown in FIG. 9, the application 2 predicts a size of data items to be written (the number of bytes) and the number of the data items to be written, based on operations on the application 2.

When receiving the file open function, the file system 3 opens the write file (step S12). Next, the application 2 issues a area reserve function to the file system 3. Input parameters for the area reserve function include the size of data items to be written (the number of bytes), the number of the data items to be written, a file stream for data write, which are requested by the application 2.

When receiving the area reserve function, the file system 3 reserves in a memory area a writable area having a size corresponding to the size and the number of the data items to be written (step S14). Note that preferably this reserved area is selected in priority order in accordance with the method of the first embodiment, in order to increase the write speed. After the area is reserved, the file system 3 notifies the application 2 of the actually allocated area.

Next, the file system 3 writes a tentative FAT predicted at a time of finish of data write, into the reserved area (step S15).

The application 2 issues a write function invocation to the file system 3 (step S16). When receiving the write function invocation, the file system 3 writes data into the reserved area without updating the FAT (step S17). If the reserved area is not large enough to write the data, the process repeats steps S13-S17.

When data write is finished, the file system 3 updates the FAT in the original area based on the data actually written (step S18).

Upon completion of writing, the application 2 issues to the file system 3 a file close function instructing to close the write file (step S19). When receiving this function, the file system 3 closes the write file (step S20).

The host according to the second embodiment has the area reserve function delivered between the application 2 and the file system 3. When receiving the area reserve function, the file system 3 reserves a write area having a size specified by the application 2 and writes a tentative FAT into this reserved area. The tentative FAT is not updated during data write. Refraining from updating the FAT during data writing can prevent write speed decrease.

Further, by performing prior writing of an FAT, the FAT as management data can be secured even if processing is suspended halfway through data writing owing to system hung-up etc., thereby preventing write data from being lost.

(3) Third Embodiment

The third embodiment has a function for an API between an application and a file system to manage a speed at which data is written into a memory card.

[3-1] Configuration

The third embodiment has the same configuration as that of the first embodiment except for the following. First, a BPB of a memory card 11 used in a host according to the third embodiment further stores parameters of an erase size, a write page size, an RU size, an AU size, write performance, and move performance as shown in FIG. 6.

The erase size indicates a size of an erase in the case where a target medium is a flash memory device, in units of 512B for example. In the case of a memory card using an NAND-type flash memory having an erase size of 512kB, this field takes on a value of 1024.

The write page size indicates a page size when the target medium is a flash memory device, in units of 512B for example. When a memory card uses a flash memory having a page size of 2kB, this field takes on a value of 4.

The write performance and the move performance are described in detail later.

An erase size, a write page size, write performance, and move performance written in a BPB allow a file system 3 to directly read these information items. The file system 3 and an application 2 refer these information items and can know a speed of write speed by the memory card 11 and easily perform write control.

A host 1 is adapted to write the parameters of erase size, write page size, write performance, and move performance into a BPB. When formatting the memory card 11, the host 1 acquires the parameters of erase size, write page size, write performance, and move performance in addition to the parameters described in the first embodiment. These parameters are acquired according to the same procedure as that for acquiring the flash device flag parameters (see the first embodiment).

[3-2] Writing

Figure 10:
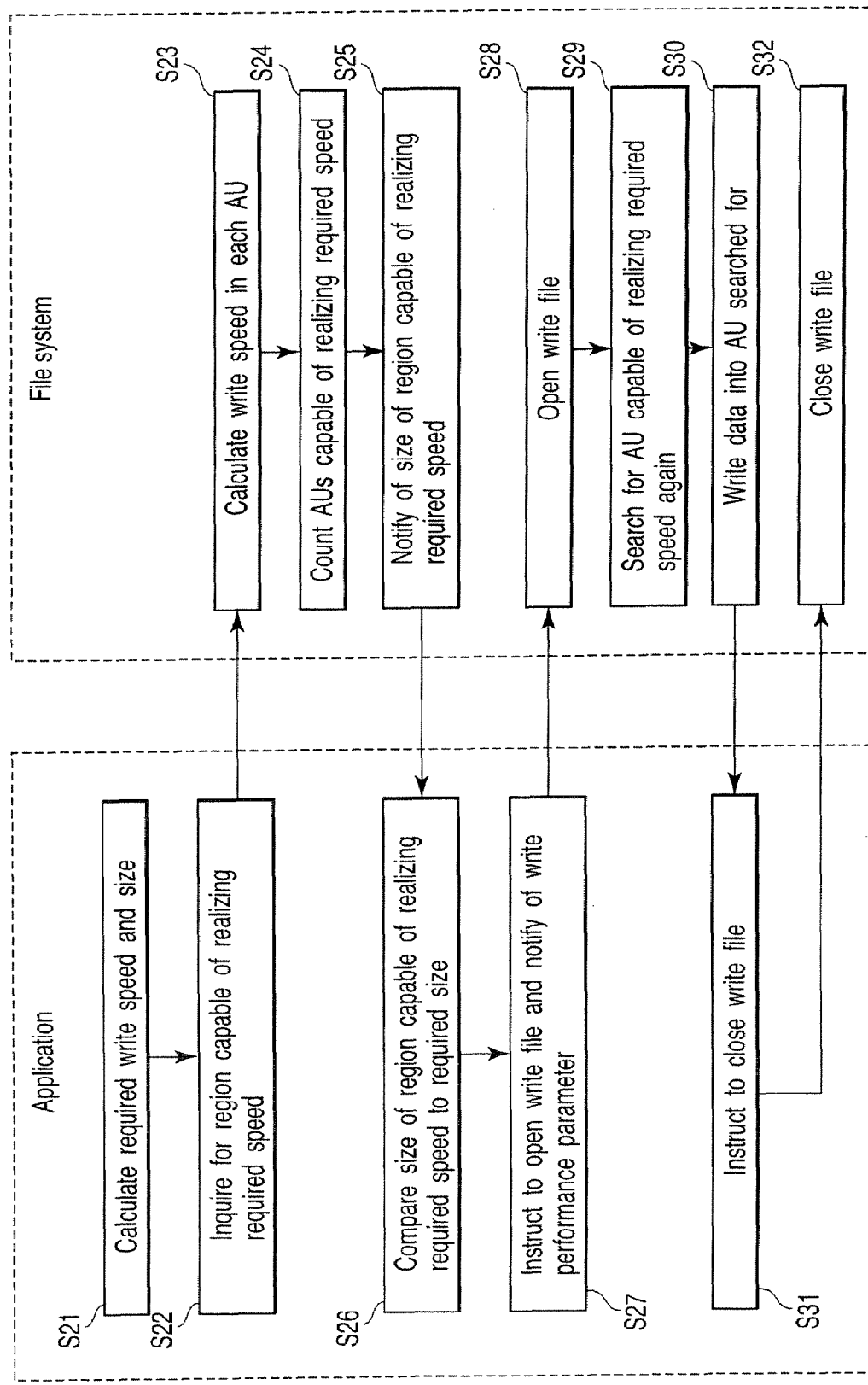
FIG. 10 shows a flow of a write operation of host apparatus according to a third embodiment of the present invention.

The following will describe a data write of a host according to the third embodiment, with reference to FIG. 10. FIG. 10 shows a flow of a writing of the host according to the third embodiment. An API between the application 2 and the file system 3 has a function that can realize the following write operation.

As shown in FIG. 10, the application 2 calculates a data write speed and a memory area size that are required (for an AV data stream) in accordance with its own application properties (step S21). Note that some hosts 1 may accommodate several different bit rate modes in accordance with types of the application 2. In this case, the host 1 needs to determine a data write speed and a memory area size that are required by an application selected in accordance with a mode selected by a user.

The application 2 issues an area inquiry function to the file system 3 to thereby make an inquiry to the file system 3 about a memory area size that realizes a speed not less than a required write speed (step S22). Input parameters for the area inquiry function include a required write speed, a FAT update frequency within a predetermined period, etc.

When receiving the area inquiry function, the file system 3 calculates a size of a free area in a memory that can realize the required speed, by using the following steps. First, the file system 3 refers to FATs to predict a data write speed in each of AUs 42 (step S23). A detailed method for predicting the write speed is described later. Note that prediction of the write speed takes a FAT update frequency in the area inquiry function into account. If the FAT update frequency is high, the write speed is decreased correspondingly.

The file system 3 searches for AUs 42 that can realize a speed not less than the required write speed already described in the area inquiry function among obtained write speeds of each AU and counts them (step S24).

The file system 3 multiplies the number of the AUs 42 that can realize a speed not less than the required write speed by a size of the AUs 42 to thereby calculate a size of a memory area that can realize the speed not less than the required write speed. Subsequently, the file system 3 returns to the application 2 this calculated memory area size as a return value of the area inquiry function (step S25). The application 2 knows that writing can be performed at the required speed or faster to at least a memory area having a size received at step S25.

The application 2 compares a required memory area size calculated at step S21 to a memory area size that can realize a required speed obtained at step S25 (step S26). If the memory area size that can realize the required speed is larger than the required memory area size, the application 2 performs data write by using later-described steps.

On the other hand, if the memory area size that can realize the required speed is smaller than the required memory area size, the application 2 notifies the user to that effect by, for example, indicating it on a display. Then, it indicates on a display equipped to the host 1 a selection dialog of, for example, "stop writing", "write only a writable quantity of data", etc. If the user selects stopping of writing, the write processing stops at this point in time.

The application 2 issues a file open function instructing to open a write file (step S27). Input parameters for the file open function at this step include a required write speed and an FAT update frequency. The application 2 sets a required speed (specified speed) to be included in the file open function, by taking into account a memory area size that can realize the earlier obtained required speed, for example. If the memory area size that can realize the required speed is sufficiently large, the input parameters (write speed and FAT update frequency) specified in the file open function are typically the same as those specified in the area inquiry function.

When receiving the file open function, the file system 3 opens a write file (step S28). The file system 3 searches for AUs 42 that can realize a write speed specified in the file open function, by using the same method as that used at step S23 (step S29).

Next, the file system 3 writes data only to such AUs 42 as to satisfy conditions, at the specified speed (step S30). A tentative FAT may be written before data write and a final FAT may be updated after data write using the method of the second embodiment during data write, which facilitates the write speed. In this case, an FAT update frequency specified in the file open function is zero.

Note that when an input parameter specified in the file open function is the same as that specified in the area inquiry function, it is possible to write it into the AUs 42 searched for at step S24. In this case, step S29 is unnecessary.

When writing is finished, the application 2 issues to the file system 3 a file close function instructing to close the write file (step S31). When receiving this function, the file system 3 closes the write file (step S32).

[3-3] Calculation of Write Speed

The following will describe a method for calculating a data write speed by reference to FIGS. 11A and 11B through FIG. 14. The file system 3 uses write performance, file system write (typically FAT write) time, and a file system update frequency, which is an input parameter for the area inquiry function to thereby calculate a write speed in an AU 42.

[3-3-1] Definition of Performance Curve

Figure 11:
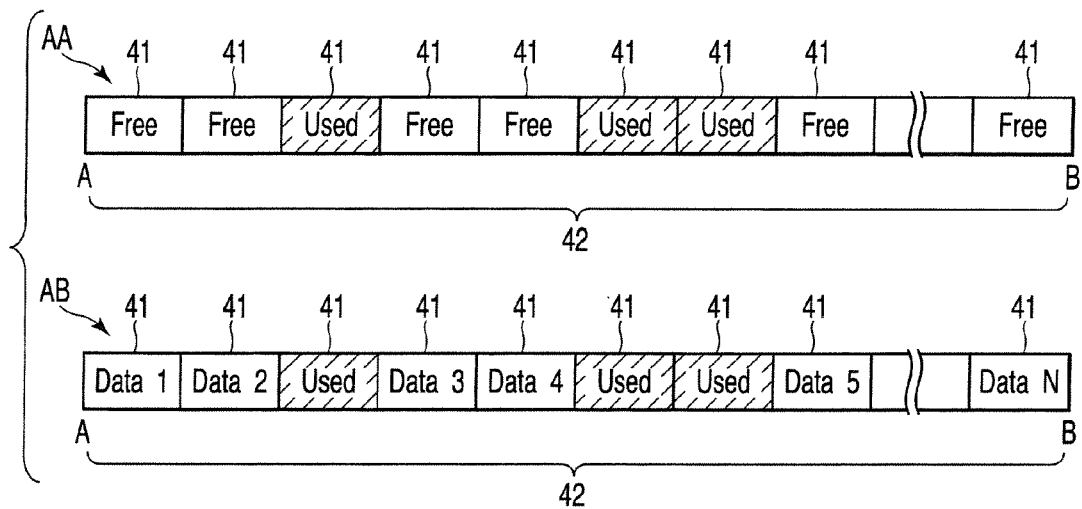
FIG. 11 shows a data movement.

The following will describe the definition by exemplifying a case where RU-unit data items are sequentially written by the host 1 from position A to position B in a memory area, with reference to FIG. 11.

A case is discussed where, as shown in FIG. 11, data is newly written into an AU 42, which is an group of RUs 41. Assume that a logical address of this AU 42 is LA. When data is newly written into RUs 41 in this AU 42, so-called data-move accompanying write is performed. More specifically, data-move accompanying write actually involves transfer of a logical address LA data held in the written RU 41 (indicated by "Used" in the figure) in a physical block AA to another physical block AB and write of new write data. After this task, the physical block AB is recognized as the logical address LA.

In implementation of this task, time in which data is newly written into the RU 41 (which is indicated by "Free" in the figure) which holds no data is simply write time. This is assumed to be write performance (Pw).

On the other hand, to transfer written data to another RU 32, it takes write time for writing the data into RU 41 in a new physical block AB plus time for reading data from the RU 41 in the old physical block AA. Furthermore, writing of new data (e.g., Data 3 in the figure) that is to be written into an RU 41 according to the original order as long as it is free must be suspended while a written data is moved to the new physical block AB. Assume that the time required for these operations is move performance for data (Pm).

Total time required for writing new data is a sum of total write time plus total move time.

From the above, average performance P (Nu) is given by the following [Equation 1]:

$$\text{Average performance: } P(Nu) = [Sc \times (Nt - Nu)] / [Sc \times (Nt - Nu)/Pw + Sc \times Nu/Pm]$$
$$= [(Nt - Nu) \times Pm \times Pw] / [(Nt - Nu) \times Pm + Nu \times Pw]$$

[Equation 1]

where:
Sc is an RU size;
Nt is a total number of RUs between addresses A and B to which information is sequentially written;
Nu is the number of used RUs between addresses A and B;
Pw is write performance (MB/s); and
Pm is move performance (MB/s).

Figure 12:
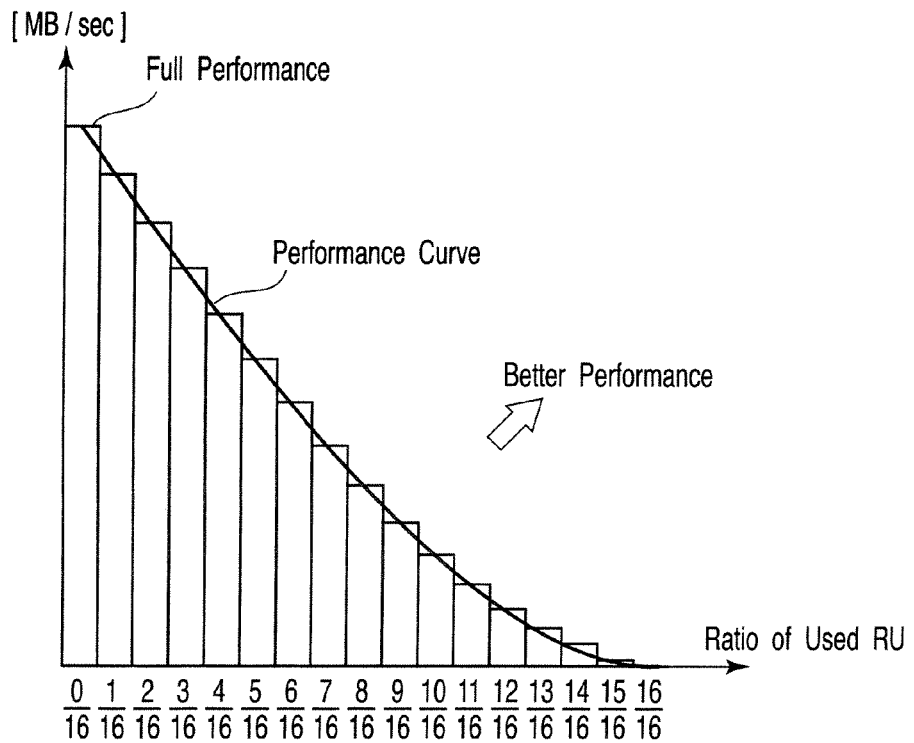
FIG. 12 exemplifies a performance curve.

FIG. 12 shows performance when the number of RUs in an AU 42 is supposed to be 16. Connecting each value of performance (vertical axis) for each ratio of used RUs (horizontal axis) one by one provides a performance curve. Write performance Pw and move performance Pm defines the performance curve. The write performance Pw is identical to performance with r=0, or to full-performance. The write performance Pw varies with program time of the storage device (flash memory 13). The move performance Pm varies with program time for the flash memory 13 as well as read time and a data move method. Note that the host 1 does not execute data movement but the memory card 11 handles it.

The ratio of used RUs can be expressed as r=Nu/Nt. It can also be written as Nu=r×Nt.

Value r can vary within the range from 0 to 1. r=0 means that all the RUs are not in use and r=1 means that all the RUs are used or performance is 0. In other words, P (1)=0.

[Equation 1] can be expressed using r, in the following [Equation 2]:

$$\text{Average performance curve: } P(r) = [(1-r) \times Pw \times Pm] / [r \times Pw + (1-r) \times Pm] \text{ where } 0 \leq r \leq 1.$$

[Equation 2]

[3-3-2] About File System Write Time

File system writing (typically FAT writing) may occur between any consecutive two RU writing or AU writing during a real time write. FIG. 13 shows a typical sequence for updating a file system during a real time write. File system update can occur in any RU 41. File system is updated at regular intervals and the number of RUs 41 which are written between certain file system update and the next file system update is regulated by a file system update interval TFU. The file system update interval TFU is obtained from a file system update frequency, which is an input parameter in the area inquiry function.

The file system write sequence is composed of three write operations. Process FAT1 and FAT2 shown in FIG. 13 indicates respective writing of file systems into FAT1 and FAT2 by one multi-block write command. File system write can start from any byte address and can be defined as writing of any length not more than 16kB.

Process DIR indicates writing of a DIR. A directory entry is generated prior to data writing and is performed only on such a portion where a directory entry is changed. File system write time $T_{FW}$ is defined as total time for the aforementioned file system write sequence. The file system write time $T_{FW}$ varies in accordance with specifications of the card controller 12.

[3-3-3] Measurement Conditions for Obtaining Average of File System Write Time ($T_{FW}$) The file system write time $T_{FW}$ is defined as a value obtained by averaging several measurement values. [Equation 3] regulates average file system write time $T_{FW}$(ave.). As can be seen from [Equation 3], a worst average value of arbitrary, for example, eight file system write cycles is used as average file system write time $T_{FW}$(ave.).

$$\text{Average file system write time: } T_{FW}(\text{ave.}) = [\max(T_{FW}(1) + T_{FW}(2) +, \ldots, T_{FW}(7) + T_{FW}(8))]/8$$

[Equation 3]

[3-3-4] Calculation of Performance

Taking into account a time loss due to file system update, in order to satisfy performance Pa requested by the application 2, higher performance Pc is actually desired. A method for the application 2 to obtain required performance Pa can be calculated by the following [Equation 4]:

$$\text{Performance required by application: } Pa = (Sc \times Nd)/(Sc \times Nd/Pc + T_{FW})$$

[Equation 4]

where Nd is the number of RUs written between a file system update and the next file system update.

Performance Pc required to satisfy performance Pa can be calculated by the following [Equation 5]:

$$\text{Performance required to satisfy performance } Pa: Pc = (Sc \times Nd \times Pa)/(Sc \times Nd - Pa \times T_{FW})$$

[Equation 5]

The host according to the third embodiment of the present invention provides a function which is delivered between the application 2 and the file system 3 and which serves to check a size of memory area that can achieve a certain write speed. When receiving this function, the file system 3 notifies the application 2 of a size of AUs 42 that can achieve a certain write speed. Therefore, the application 2 can easily manage a write speed at the memory card 11. With this, the application 2 can set a required write speed and instruct the file system 3 to write that data only into an AUs 42 that can achieve the required write speed in accordance with the notified memory area size.

Although in the above embodiments an example of a FAT file system is described, the present invention can be applied also to a different file system that has a similar file access.

Further, although the first through third embodiments are described in line with a program structure in personal computers, these embodiments can be applied also to any other microcomputer-adapted apparatuses such as a home information appliance.

Further, description is made about the memory card 11 having the flash memory 13, the first through third embodiments can be applied also to any other media having similar characteristics and functions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A host apparatus controlling a memory system which has a nonvolatile semiconductor memory, the host apparatus comprising:
  an application configured to perform predetermined operations in accordance with a program and to issue a write function invocation;
  a file management system configured to allocate unit regions into which a memory area of the nonvolatile semiconductor memory is divided as a write area which stores write data, using management units each of which is natural-number multiple times as large as the unit region as units for determining allocation, and to allocate the management units as the write area in an order of realizable write speed of the management units when receiving the write function invocation, the realizable write speed of each of the management units being dependent on a distribution of unit regions to which data can be written within a corresponding management unit; and
  a controller configured to issue an instruction to the memory system to write the write data into the nonvolatile semiconductor memory in accordance with an instruction by the file management system.

2. The host apparatus according to claim 1, wherein
  when a first condition that a group of the unit regions following a unit region into which information is written most recently in the management unit is not used is satisfied. the file management system sequentially allocates the group of the unit regions as the write area starting at a top one in the group and,
  when the first condition is not satisfied, the file system assigns the write data sequentially to the management units starting at the management unit composed of the unit regions not in use.

3. The host apparatus according to claim 1, wherein the write data is assigned to the management unit that includes the unit regions in use when there is no management unit that is composed of the unit regions not in use.

4. The host apparatus according to claim 1, wherein the management unit is natural-number multiple times as large as an erase unit of the memory system.

5. The host apparatus according to claim 1, wherein the file management system allocates the management units as the write area in an order based on the quantity of unit regions used by each management unit, wherein write speed of the management units decreases in accordance with the distribution of unit regions to which data can be written within the corresponding management unit.

6. A host apparatus controlling a memory system which has a nonvolatile semiconductor memory, the host apparatus comprising:
  an application configured to perform predetermined operations in accordance with a program and to issue an area reserve function;
  a file management system configured to allocate unit regions into which a memory area of the nonvolatile semiconductor memory is divided as a write area which stores write data, the file management system, when receiving the area reserve function, configured to reserve an area constituted of the unit regions having a size in accordance with a size of the write data, to issue an instruction to write tentative management data into the reserved area, the tentative management data being anticipated management data to be written on completion of writing of the write data, the tile management system issuing an instruction to write the write data without updating management data after allocating the reserved area as the write area, and issue an instruction to update the management data in accordance with actually-written write data after writing of the write data is finished; and
  a controller configured to issue an instruction to the memory system to write the write data and the management data into the nonvolatile semiconductor memory in accordance with an instruction by the file management system.

7. The host apparatus according to claim 6, wherein the management unit is natural-number multiple times as large as an erase unit of the memory system.

8. The host apparatus according to claim 6, wherein the area reserve function contains information for determining a size of write data.

9. The hose apparatus according to claim 8, wherein a size of the reserved area is determined from the information contained in the area reserve function.

10. A host apparatus controlling a memory system which has a nonvolatile semiconductor memory, the host apparatus comprising:
  an application performing predetermined operations in accordance with a program and issuing a area inquiry function including information of a requested write speed;
  a file management system having a function to allocate unit regions into which a memory area of the nonvolatile semiconductor memory is divided as a write area which stores write data and notifying the application of the number of the unit regions capable of realizing writing at a speed not less than the requested write speed when receiving the area inquiry function; and
  a controller issuing an instruction to the memory system to write the write data into the nonvolatile semiconductor memory in accordance with an instruction by the file management system.

11. The host apparatus according to claim 10, wherein the application further has a function to issue a file open function for opening a file to write the write data only into a specified write area composed of the unit regions capable of realizing a specified write speed.

12. The host apparatus according to claim 11, wherein the application further has a function to issue a write function invocation for an instruction to write the write data only into the specified write area.

13. The host apparatus according to claim 10, wherein the file management system uses a performance prediction parameter of the memory system that is read from the memory system upon start of power supply on the memory system to calculate the number of the unit regions capable of realizing writing at a speed not less than the requested write speed.

14. The host apparatus according to claim 10, wherein the management unit is natural-number multiple times as large as an erase unit of the memory system.

* * * * *